(12) United States Patent
Sakaguchi et al.

(10) Patent No.: US 9,459,641 B2
(45) Date of Patent: Oct. 4, 2016

(54) VOLTAGE REGULATOR

(71) Applicant: Seiko Instruments Inc., Chiba-shi, Chiba (JP)

(72) Inventors: Kaoru Sakaguchi, Chiba (JP); Teruo Suzuki, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 145 days.

(21) Appl. No.: 13/754,102

(22) Filed: Jan. 30, 2013

(65) Prior Publication Data

US 2013/0193939 A1 Aug. 1, 2013

(30) Foreign Application Priority Data

Jan. 31, 2012 (JP) ................................ 2012-018668

(51) Int. Cl.
| | |
|---|---|
| G05F 1/573 | (2006.01) |
| H02H 9/02 | (2006.01) |
| H02M 1/00 | (2006.01) |
| G05F 1/56 | (2006.01) |
| G05F 1/569 | (2006.01) |

(52) U.S. Cl.
CPC ............. *G05F 1/5735* (2013.01); *G05F 1/573* (2013.01); *H02H 9/02* (2013.01); *H02H 9/025* (2013.01); *G05F 1/56* (2013.01); *G05F 1/569* (2013.01); *H02M 2001/0025* (2013.01)

(58) Field of Classification Search
CPC ..................................................... H02M 3/156
USPC ......... 323/281, 313, 314, 271, 273–280, 297
See application file for complete search history.

(56) References Cited

U.S. PATENT DOCUMENTS

| | | | | |
|---|---|---|---|---|
| 4,349,777 | A * | 9/1982 | Mitamura | G05F 1/561 323/226 |
| 6,016,245 | A * | 1/2000 | Ross | 361/86 |
| 7,183,755 | B2 * | 2/2007 | Itoh et al. | 323/274 |
| 7,274,180 | B2 * | 9/2007 | Itoh | 323/283 |
| 7,501,801 | B2 * | 3/2009 | Brown et al. | 323/224 |
| 7,548,044 | B2 * | 6/2009 | Itoh et al. | 323/274 |
| 7,619,402 | B1 * | 11/2009 | Kwong | G05F 1/575 323/297 |
| 7,705,579 | B1 * | 4/2010 | Hariman et al. | 323/284 |
| 7,906,952 | B2 * | 3/2011 | Kuo et al. | 323/284 |
| 8,018,214 | B2 * | 9/2011 | Kwon | G05F 1/565 323/271 |
| 8,086,355 | B1 * | 12/2011 | Stanczak | H02H 1/0092 323/282 |
| 8,169,202 | B2 * | 5/2012 | Chen | 323/273 |
| 8,174,251 | B2 * | 5/2012 | Kimura | 323/273 |
| 8,242,760 | B2 * | 8/2012 | Takagi et al. | 323/276 |
| 8,384,370 | B2 * | 2/2013 | Nakashimo | 323/316 |
| 2007/0108949 | A1 * | 5/2007 | Ohoka | 323/271 |
| 2008/0036436 | A1 * | 2/2008 | Lewis | 323/274 |

(Continued)

FOREIGN PATENT DOCUMENTS

JP 2005-293067 A 10/2005

*Primary Examiner* — Timothy J Dole
*Assistant Examiner* — Bryan R Perez
(74) *Attorney, Agent, or Firm* — Brinks Gilson & Lione

(57) ABSTRACT

Provided is a variable output voltage regulator capable of reducing heat generation during an overcurrent protection operation even when a setting value of an output voltage is high. The variable output voltage regulator can change an output voltage by trimming a resistor of a voltage dividing circuit in response to a trimming signal output from a trimming signal generation circuit. The trimming signal is used to change a limiting voltage of a fold-back type overcurrent protection circuit.

5 Claims, 10 Drawing Sheets

(56) References Cited

U.S. PATENT DOCUMENTS

| | | | |
|---|---|---|---|
| 2008/0136398 A1* | 6/2008 | Nakashimo | G05F 1/569 323/299 |
| 2008/0272753 A1* | 11/2008 | Kawashima | G05F 1/573 323/277 |
| 2009/0243567 A1* | 10/2009 | Nakashimo | 323/273 |
| 2010/0134085 A1* | 6/2010 | Nishida | 323/285 |
| 2010/0142283 A1* | 6/2010 | Ha | 365/185.18 |
| 2010/0213908 A1* | 8/2010 | Chen | 323/281 |
| 2010/0213909 A1* | 8/2010 | Nakashimo | 323/282 |
| 2011/0001458 A1* | 1/2011 | Bansal | G05F 1/575 323/282 |
| 2011/0074370 A1* | 3/2011 | Imura | G05F 1/573 323/277 |
| 2012/0169303 A1* | 7/2012 | Chen | 323/265 |

\* cited by examiner

VOLTAGE REGULATOR

RELATED APPLICATIONS

This application claims priority under 35 U.S.C. §119 to Japanese Patent Application No. 2012-018668 filed on Jan. 31, 2012, the entire content of which is hereby incorporated by reference.

BACKGROUND OF THE INVENTION

1. Field of the Invention

The present invention relates to a variable output voltage regulator including an overcurrent protection circuit.

2. Description of the Related Art

Description is made of a conventional variable output voltage regulator. FIG. 10 is a diagram illustrating the conventional variable output voltage regulator.

The conventional variable output voltage regulator includes a ground terminal 100, a power supply terminal 101, an output terminal 102, an external control terminal 103, an amplifier 104, an output transistor 105, a voltage dividing circuit 106, a reference voltage source 107, a drooping type overcurrent protection circuit 108, a fold-back type overcurrent protection circuit 109, and a trimming signal generation circuit 110.

Description is made of an operation of the conventional variable output voltage regulator.

When an output voltage Vout of the output terminal 102 is higher than a predetermined voltage, that is, when a divided voltage Vfb of the voltage dividing circuit 106 is higher than a reference voltage Vref, an output voltage of the amplifier 104 becomes higher. A gate voltage of the output transistor 105 increases, and hence the output transistor 105 is gradually turned OFF and the output voltage Vout decreases. On the other hand, when the output voltage Vout is lower than the predetermined voltage, the output voltage Vout increases in the same manner as described above. In other words, the output voltage Vout of the voltage regulator is maintained to a constant predetermined voltage.

In this case, signals $\phi1$, $\phi2$, and $\phi3$ output from the trimming signal generation circuit 110 in accordance with an electrical signal CONT input from the external control terminal 103 are input to gates of MOS switches connected in parallel to resistors 151, 152, and 153 in the voltage dividing circuit 106, respectively. Therefore, based on the electrical signal CONT, a voltage division ratio of the voltage dividing circuit 106 can be adjusted.

The output voltage Vout of the voltage regulator is determined based on the reference voltage Vref and the voltage division ratio of the voltage dividing circuit 106. Therefore, the output voltage Vout can be controlled by a signal input to the external control terminal 103. In FIG. 10, the variable output voltage regulator is realized by the switches connected in parallel to the respective resistors 151, 152, and 153, but the numbers of resistors and switches, the type of the switches, and positions of the resistors connected to the switches are not limited thereto (see Japanese Patent Application Laid-open No. 2005-293067).

Next, description is made of an operation of the conventional overcurrent protection circuit of the voltage regulator.

The overcurrent protection circuit is divided into a drooping type overcurrent protection circuit and a fold-back type overcurrent protection circuit. In the conventional overcurrent protection circuit, the drooping type overcurrent protection circuit and the fold-back type overcurrent protection circuit both operate so as to detect an output current Iout flowing through the output transistor 105, and control the gate voltage of the output transistor 105 to prevent an output current equal to or larger than a certain amount from flowing therethrough.

FIG. 11 is a graph showing output voltage-output current characteristics in a case where the drooping type overcurrent protection circuit and the fold-back type overcurrent protection circuit are used in combination. The drooping type overcurrent protection circuit has the following feature. In order to limit the output current Iout to a constant maximum current Im, when a current equal to or larger than the maximum current Im is caused to flow, the drooping type overcurrent protection circuit decreases the output voltage Vout while maintaining the constant output current Iout. In this manner, the heat loss which occurs in a load of the voltage regulator can be reduced. On the other hand, the fold-back type overcurrent protection circuit reduces the output current Iout in proportion to the reduction of the output voltage Vout when the output voltage Vout becomes equal to or smaller than a limiting voltage Vfo. That is, when the output voltage Vout is 0 V, the output current Iout is fixed to a constant short-circuit current Is. The fold-back type overcurrent protection circuit can further reduce the heat loss which occurs in the voltage regulator. In this case, the maximum current Im, the short-circuit current Is, and the limiting voltage Vfo are preset in the circuit (see Japanese Patent Application Laid-open No. 2005-293067).

However, in the conventional variable output voltage regulator including the overcurrent protection circuit, when the maximum output voltage Vout is set, the loss during the operation of the drooping type overcurrent protection circuit increases.

Power loss P of the voltage regulator is represented as follows:

$$P=(Vin-Vout) \times Iout \qquad (1)$$

where Vin represents an input voltage of the power supply terminal. Thus, the loss becomes the maximum when there is a great voltage difference between the input voltage Vin and the output voltage Vout. That is, the loss becomes the maximum at (Iout, Vout)=(Im, Vfo) in FIG. 11 when the operation of the drooping type overcurrent protection circuit is switched to the operation of the fold-back type overcurrent protection circuit. As the setting value of the output voltage Vout becomes high, the input voltage Vin needs to be high. Therefore, as the setting value of output voltage Vout becomes high, the loss at (Iout, Vout)=(Im, Vfo) increases, which may lead to circuit damage even when the overcurrent protection circuit is operated.

SUMMARY OF THE INVENTION

The present invention has been made in view of the above-mentioned problem, and provides a variable output voltage regulator having an increased safety with a simple circuit and by reducing the loss during an overcurrent protection operation.

In order to solve the conventional problem, there is provided a variable voltage regulator including drooping type and fold-back type overcurrent protection circuits. A signal based on a trimming signal input to a voltage dividing circuit is input to a variable resistor circuit for determining a limiting voltage Vfo of the fold-back type overcurrent protection circuit and a short-circuit current Is.

In the variable output voltage regulator of the present invention, in accordance with a setting value of an output voltage Vout, a voltage and a current, at which the fold-back type overcurrent protection circuit is operated, can be set. In this manner, when the setting value of the output voltage Vout is high, the limiting voltage Vfo is set high and the short-circuit current Is is set small. In this manner, a maximum current Im of the voltage regulator can be maintained constant, and the loss can be reduced even in a condition in which the loss becomes the maximum during an overcurrent protection circuit operation. Further, a signal input to the voltage dividing circuit of the variable voltage regulator is used, and hence it is possible to support a plurality of output voltage settings without increasing the circuit scale. Therefore, the variable output voltage regulator of the present invention is very useful in terms of area efficiency.

DETAILED DESCRIPTION OF THE PREFERRED EMBODIMENTS

Figure 1:
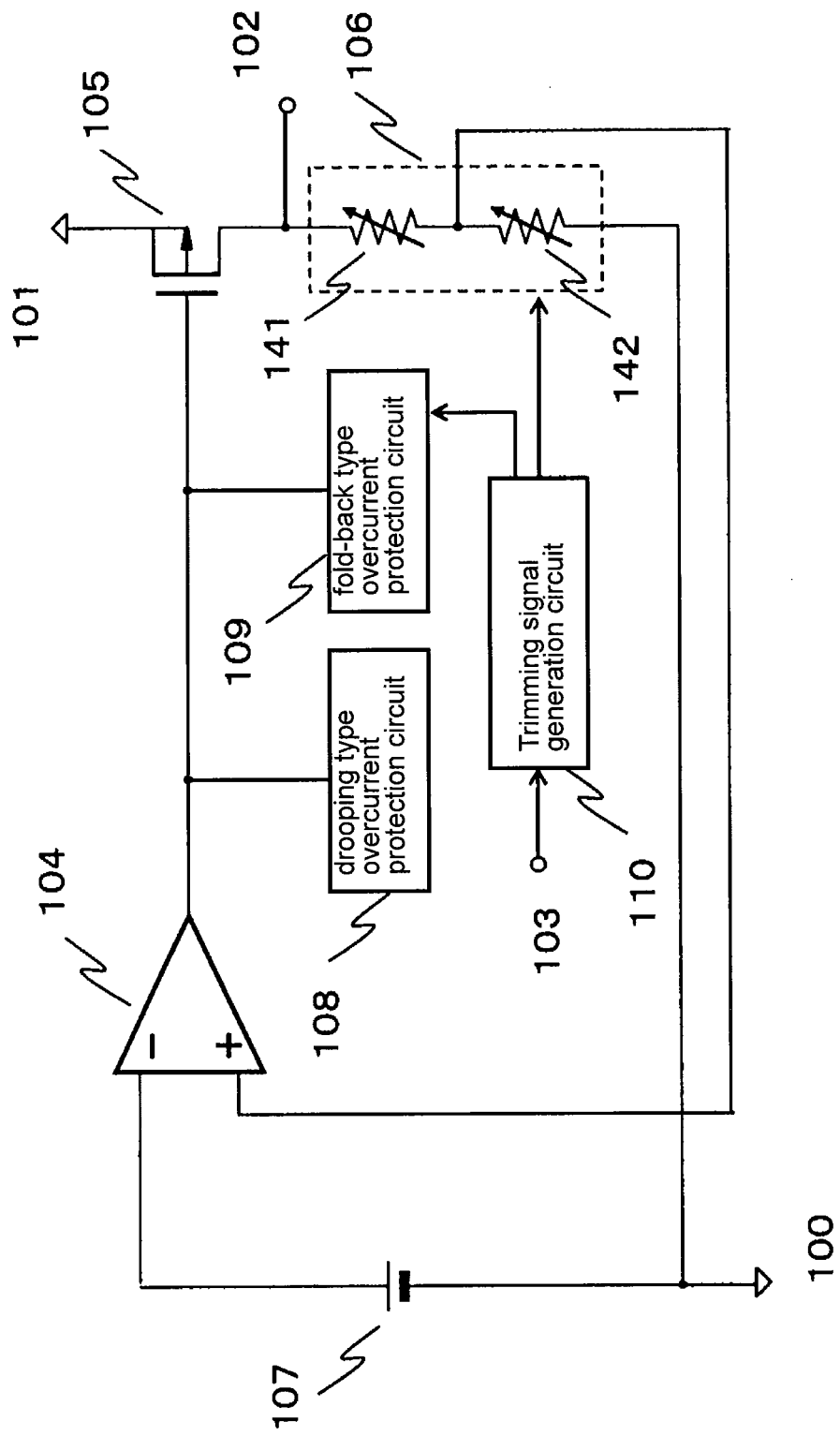
FIG. 1 is a block diagram illustrating a variable output voltage regulator according to an embodiment mode of the present invention.

FIG. 1 is a block diagram illustrating a variable output voltage regulator according to an embodiment mode of the present invention.

The variable output voltage regulator according to the embodiment mode of the present invention is configured to trim a variable resistor 141 and a variable resistor 142 of a voltage dividing circuit 106 in response to a trimming signal obtained by converting a control signal input from an external control terminal 103 by a trimming signal generation circuit 110, and switch a limiting voltage Vfo of a fold-back type overcurrent protection circuit 109.

In the following, description is made of variable output voltage regulators according to specific embodiments of the present invention with reference to the drawings.

First Embodiment

Figure 2:
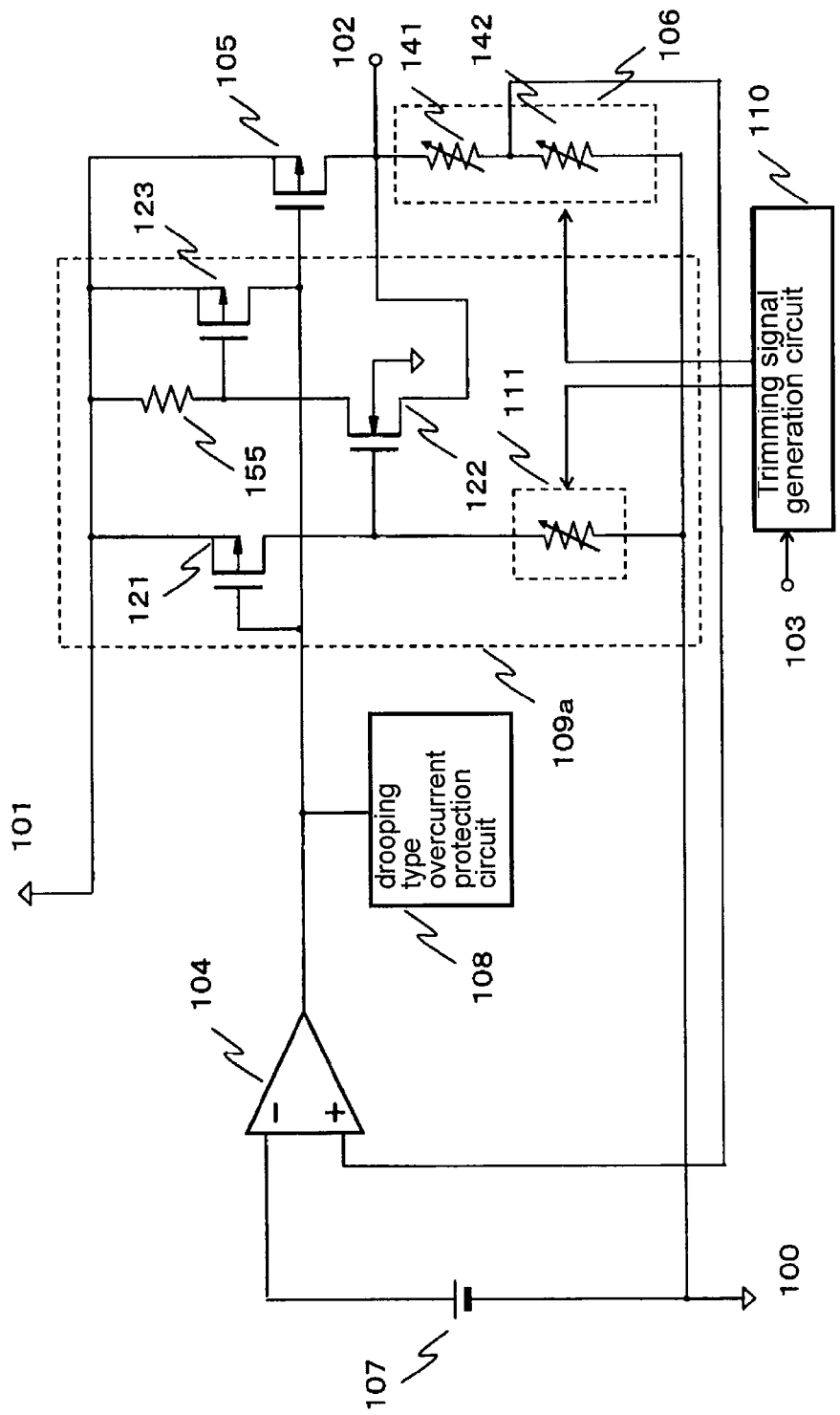
FIG. 2 is a circuit diagram illustrating a variable output voltage regulator according to a first embodiment of the present invention.

FIG. 2 is a circuit diagram illustrating a variable output voltage regulator according to a first embodiment of the present invention.

The variable output voltage regulator according to the first embodiment includes an amplifier 104, an output transistor 105, the voltage dividing circuit 106, a reference voltage source 107, a drooping type overcurrent protection circuit 108, a fold-back type overcurrent protection circuit 109a, and the trimming signal generation circuit 110.

The fold-back type overcurrent protection circuit 109a includes a sense transistor 121 for an output current, a variable resistor circuit 111, an NMOS transistor 122, a resistor 155, and a PMOS transistor 123.

The amplifier 104 has an inverting input terminal connected to an output of the reference voltage source 107, a non-inverting input terminal connected to an output terminal of the voltage dividing circuit 106, and an output terminal connected to the drooping type overcurrent protection circuit 108, the fold-back type overcurrent protection circuit 109a, and a gate of the output transistor 105. The output transistor 105 has a source connected to a power supply terminal 101, and a drain connected to an output terminal 102. The voltage dividing circuit 106 is connected between the output terminal 102 and a ground terminal 100. A connection point between the variable resistor 141 and the variable resistor 142 is connected to the non-inverting input terminal of the amplifier 104. The trimming signal generation circuit 110 has an input connected to the external control terminal 103, and an output connected to the voltage dividing circuit 106 and the fold-back type overcurrent protection circuit 109a.

The sense transistor 121 has a source connected to the power supply terminal 101, and a drain connected to a gate of the NMOS transistor 122. The variable resistor circuit 111 has one terminal connected to the gate of the NMOS transistor 122, and the other terminal connected to the ground terminal 100. The NMOS transistor 122 has a source connected to the output terminal 102, and a drain connected to a gate of the PMOS transistor 123 and one terminal of the resistor 155. The other terminal of the resistor 155 is connected to the power supply terminal 101. The PMOS transistor 123 has a source connected to the power supply terminal 101, and a drain connected to the gate of the output transistor 105.

Next, description is made of an operation of the voltage regulator according to the first embodiment.

When a load connected to the output terminal 102 increases, a current Iout flowing through the output transistor 105 increases. When Tout increases to reach a constant maximum current Im, the drooping type overcurrent protection circuit 108 operates to reduce an output voltage Vout. At this time, a current in proportion to Im flows through the sense transistor 121, which is current-mirror connected to the output transistor 105, and a constant voltage Vm is generated across the variable resistor circuit 111. When the output voltage Vout reduces down to a constant limiting voltage Vfo and a gate-source voltage of the NMOS transistor 122 exceeds a threshold voltage, a fold-back type overcurrent protection function is operated. The NMOS transistor 122 is turned ON, a current flows through the resistor 155, and a voltage is generated across the resistor 155. Then, the PMOS transistor 123 is gradually turned ON, and a gate-source voltage of the output transistor 105 is reduced. Thus, the output current Tout is reduced, and the output voltage-output current characteristics are indicated by a fold-back line. The limiting voltage Vfo and an output current when the output voltage is reduced to 0 V, that is, a short-circuit current Is are determined based on a resistance value of the variable resistor circuit 111.

Further, the voltage regulator of the first embodiment switches the limiting voltage Vfo of the fold-back type overcurrent protection circuit 109a as follows.

In response to a trimming signal output from the trimming signal generation circuit 110, the voltage dividing circuit 106 trims the resistance value(s) of both or one of the variable resistor 141 and the variable resistor 142, to thereby set a voltage division ratio. The voltage division ratio of the voltage dividing circuit 106 determines the output voltage Vout of the voltage regulator. In response to the trimming signal output from the trimming signal generation circuit 110, the fold-back type overcurrent protection circuit 109a trims the resistance value of the variable resistor circuit 111 to set the voltage division ratio. Then, the limiting voltage Vfo and the short-circuit current Is, at which the operation of the fold-back type overcurrent protection function is started, are determined. That is, based on the trimming signal output from the trimming signal generation circuit 110, the output voltage Vout, the limiting voltage Vfo of the fold-back type overcurrent protection circuit, and the short-circuit current Is can be controlled in association with one another.

Figure 3:
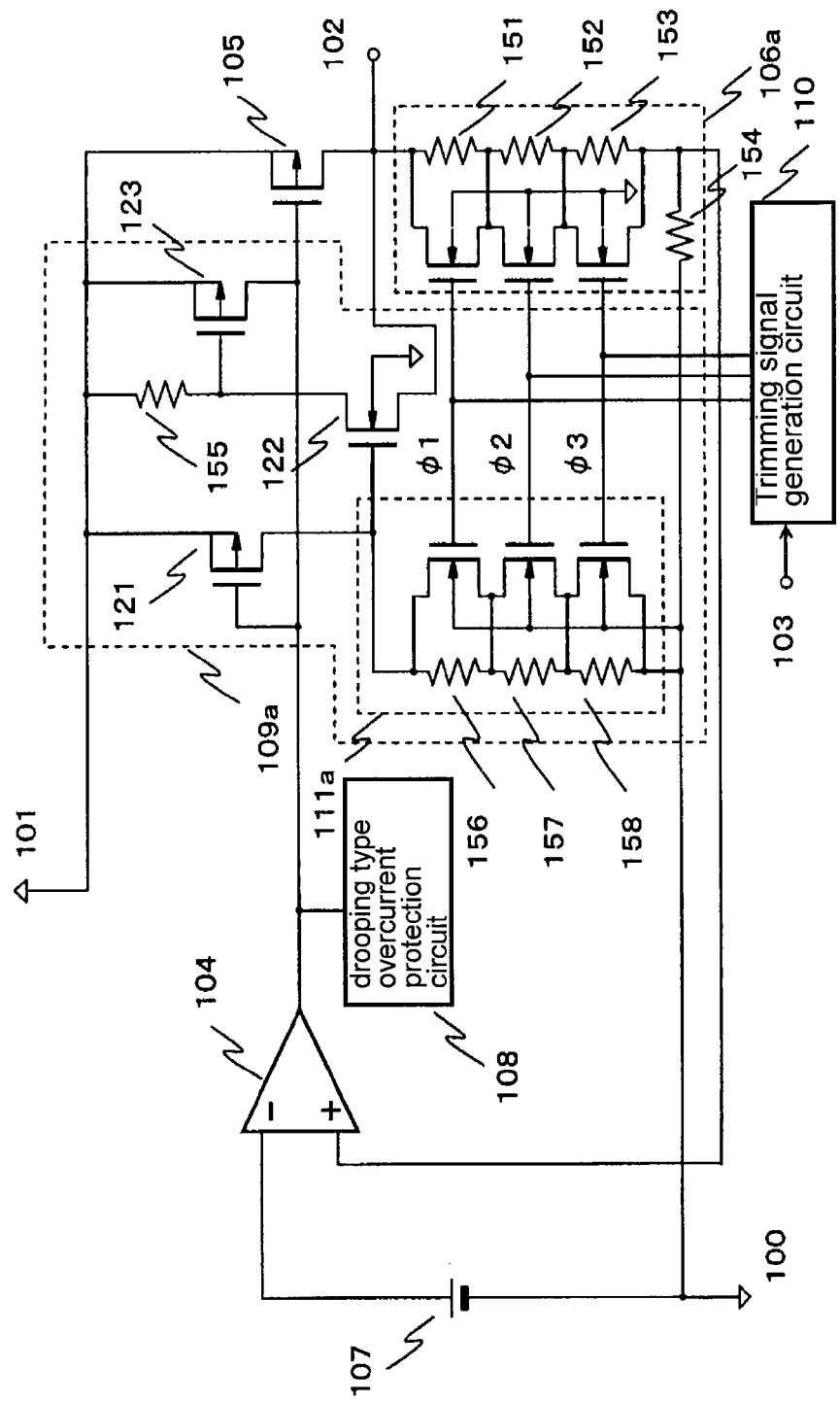
FIG. 3 is a circuit diagram illustrating an example of the variable output voltage regulator according to the first embodiment.

FIG. 3 is a circuit diagram illustrating one specific example of the variable resistors 111, 141, and 142 of the variable voltage regulator of this embodiment.

Trimming signals φ1, φ2, and φ3 output from the trimming signal generation circuit 110 are input to gates of MOS switches connected in parallel to resistors 151, 152, and 153 in a voltage dividing circuit 106a, respectively, and to gates of MOS switches connected in parallel to resistors 156, 157, and 158 in a variable resistor circuit 111a, respectively.

The circuit of FIG. 3 has a feature in that the resistance value of the variable resistor circuit 111a and the voltage dividing circuit 106a are changed with the same trimming signal of the trimming signal generation circuit 110. For example, when the trimming signal φ1 outputs a Low voltage, the MOS switch connected in parallel to the resistor 151 of the voltage dividing circuit 106a is turned OFF, and hence a current flows through the resistor 151. Therefore, the voltage division ratio of a resistor 154 in the voltage dividing circuit 106a is reduced, and hence the output voltage Vout increases. On the other hand, the MOS switch connected in parallel to the resistor 156 of the variable resistor circuit 111a of the fold-back type overcurrent protection circuit 109a is simultaneously turned OFF. The resistance value of the variable resistor circuit 111a is accordingly increased, and hence the voltage of the gate of the NMOS transistor 122 is increased. When the gate voltage of the NMOS transistor 122 is high, the limiting voltage Vfo at which the fold-back overcurrent protection operation is started increases. As a result, through increase of the limiting voltage Vfo, the increase of power loss can be cancelled, which occurs in the regulator because the output voltage is set high and thus the power supply voltage Vin is increased.

Similarly, the short-circuit current Is is reduced by an amount of increase of the resistance value of the variable resistor circuit 111a. Therefore, the loss at the time of short-circuit is reduced as well, and a risk to be caused by heat generation as a regulator is reduced.

Note that, in FIG. 3, the voltage dividing circuit 106a and the variable resistor circuit 111a are each configured so that the resistors and the MOS switches are connected in parallel to each other, and the gates of the MOS switches are connected to the output of the trimming signal generation circuit, to thereby form three sets of combinations each including the resistor and the switch, but the number of the resistors and the type of the switches are not limited thereto.

Figure 4:
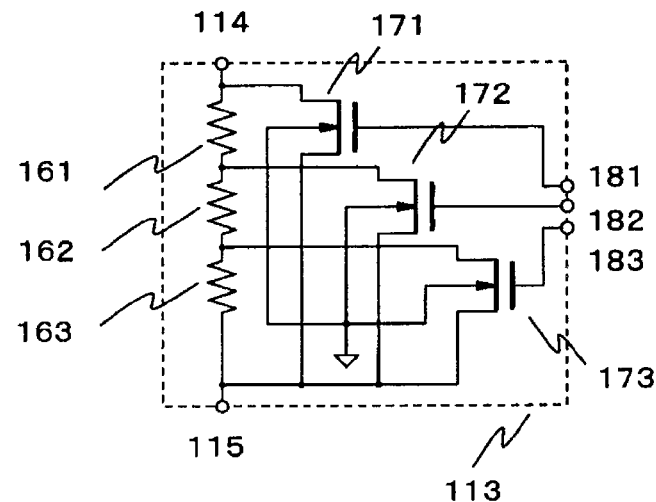
FIG. 4 is a circuit diagram illustrating a variable resistor of the variable output voltage regulator according to the first embodiment.

Further, the variable resistor circuit may be a circuit as illustrated in FIG. 4. The variable resistor circuit of FIG. 4 is applied to the variable resistors 141 and 142 of the voltage dividing circuit 106, and the variable resistor circuit 111 of the overcurrent protection circuit 109a. The MOS switches are not connected in series, and thus only one ON resistance of the switch affects the resistance value at minimum. Therefore, the accuracy of the resistance value is increased, and thus the effect of increasing the accuracies of the output voltage, and the limiting voltage Vfo and the short-circuit current Is of the overcurrent protection circuit can be obtained.

Figure 5:
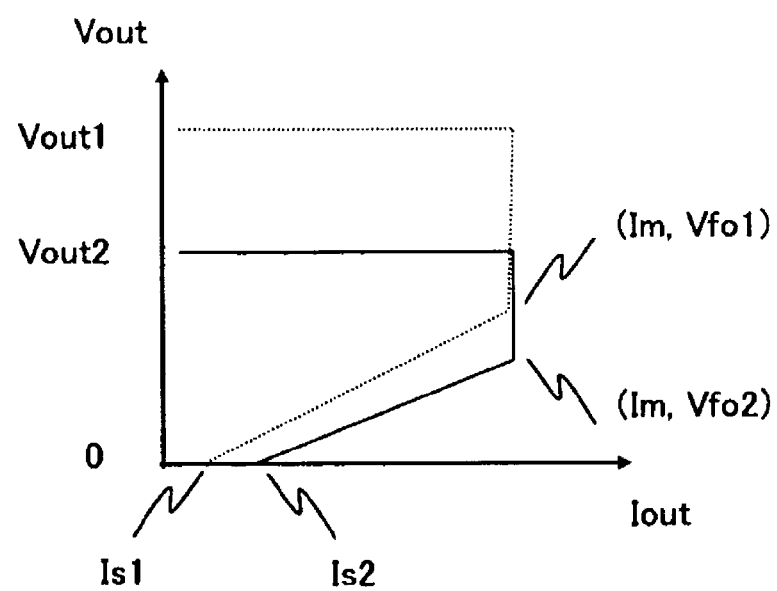
FIG. 5 is a graph showing output voltage-output current characteristics of the variable output voltage regulator according to the first embodiment.

FIG. 5 is a graph showing output voltage-output current characteristics of the voltage regulator of this embodiment.

In a condition of a low output voltage setting Vout2 of the voltage regulator, as is understood from Expression (1), the power loss is the maximum at the time of (Iout, Vout)=(Im, Vfo2). On the other hand, in a condition of a high output voltage setting Vout1, the power loss is the maximum at the time of (Iout, Vout)=(Im,Vfo1). With the configuration of this embodiment, the relationship of the limiting voltage becomes Vfo2<Vfo1, and hence even in the high output voltage condition, the power loss does not increase as in the conventional case. Therefore, with use of the voltage regulator of this embodiment, it is possible to reduce heat generation due to the loss, and increase the safety.

Second Embodiment

Figure 6:
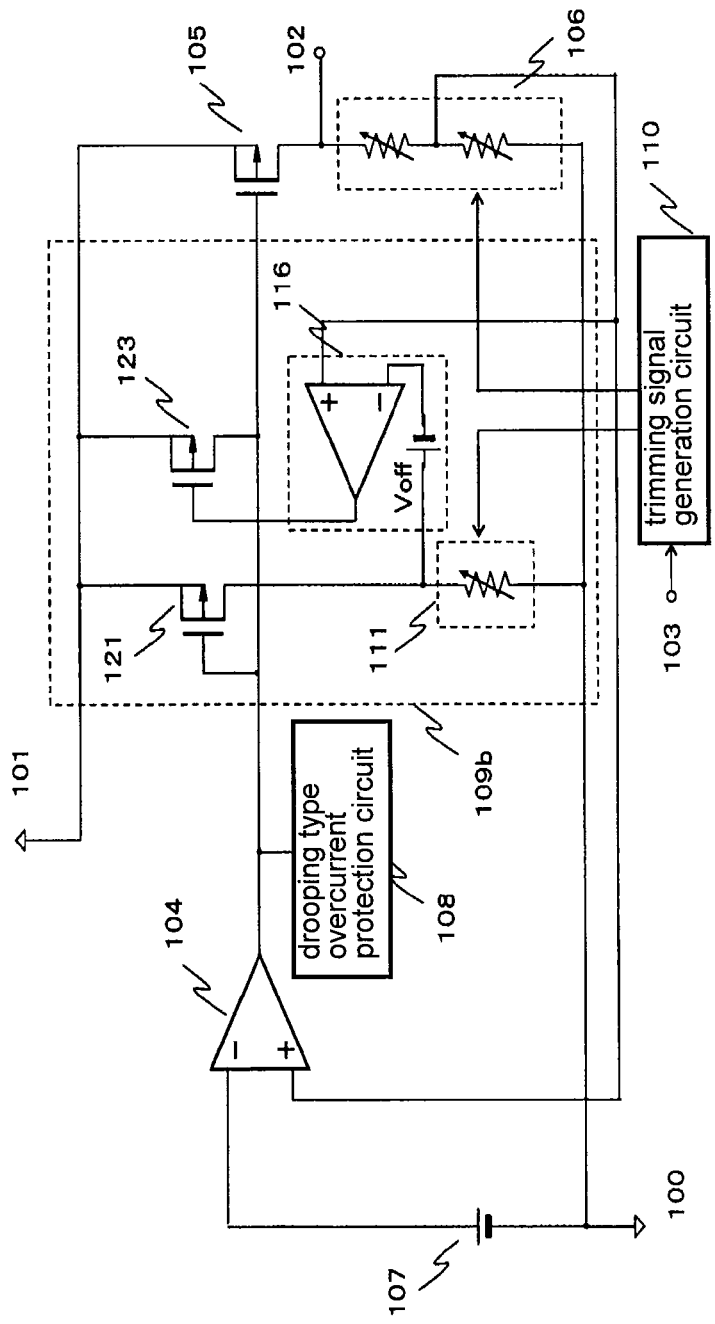
FIG. 6 is a circuit diagram illustrating a variable output voltage regulator according to a second embodiment of the present invention.

FIG. 6 is a circuit diagram illustrating a variable output voltage regulator according to a second embodiment of the present invention. Description is made of a fold-back type overcurrent protection circuit 109b of FIG. 6. Components other than the fold-back type overcurrent protection circuit 109b are similar to those of the first embodiment.

The fold-back type overcurrent protection circuit 109b of FIG. 6 includes an amplifier 116 instead of the NMOS transistor 122 and the resistor 155. The amplifier 116 has an inverting input terminal connected to the drain of the sense transistor 121, a non-inverting input terminal connected to the non-inverting input terminal of the amplifier 104, and an output terminal connected to the gate of the PMOS transistor 123.

In this case, the amplifier 116 has a finite offset voltage Voff, and the short-circuit current Is is determined by Voff regardless of the resistance value of the variable resistor circuit 111. The limiting voltage Vfo is determined based on the resistance value of the variable resistor circuit 111.

Figure 7:
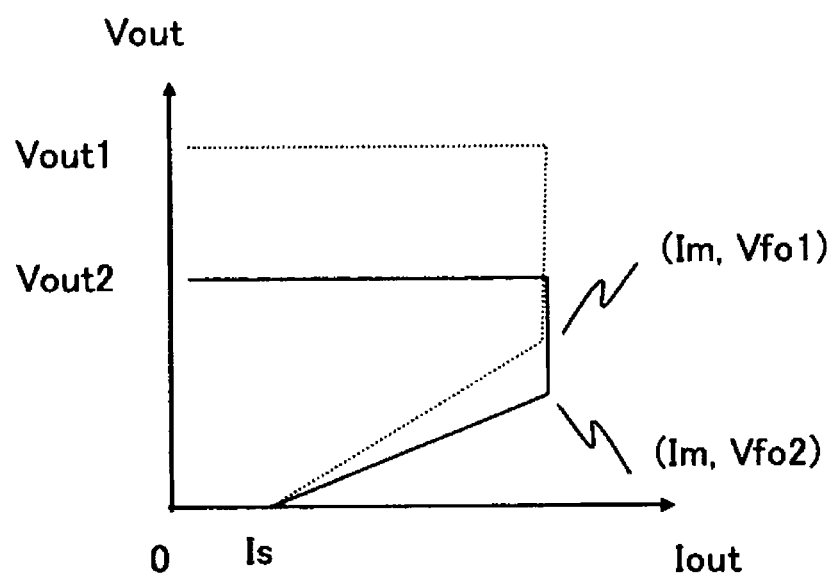
FIG. 7 is a graph showing output voltage-output current characteristics of the variable output voltage regulator according to the second embodiment.

FIG. 7 is a graph showing output voltage-output current characteristics of the voltage regulator according to the second embodiment. In each of the high output voltage Vout1 and the low output voltage Vout2, the short-circuit current Is is not changed, and only the limiting voltage Vfo is changed. That is, the short-circuit current Is is constant regardless of the output of the trimming signal generation circuit 110. Therefore, an effect can be obtained against activation failure of the voltage regulator to be caused by a decreased short-circuit current Is due to the increased output voltage Vout.

In this case, even when the non-inverting input terminal of the amplifier 116 is connected to the output terminal 102 or another output terminal formed in the voltage dividing circuit 106, the similar effect can be obtained.

Third Embodiment

Figure 8:
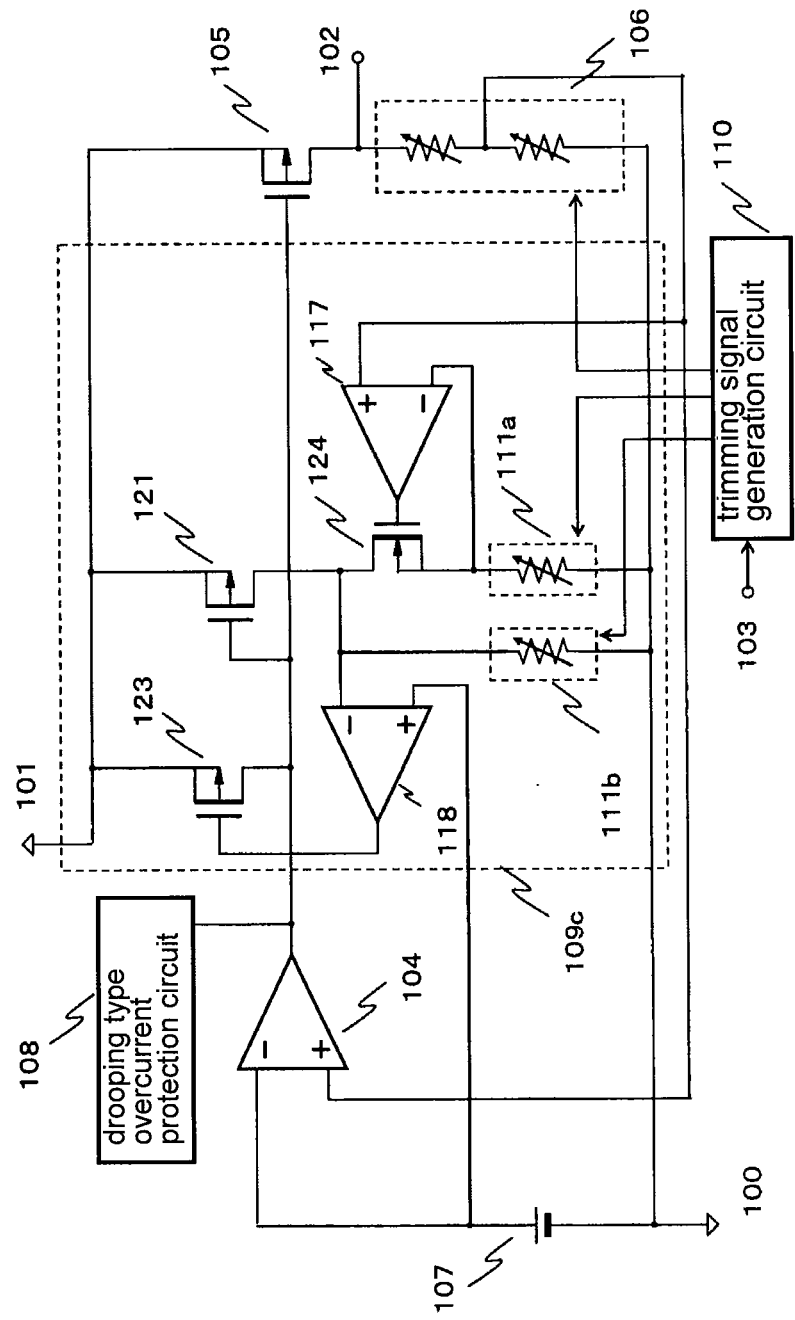
FIG. 8 is a circuit diagram illustrating a variable output voltage regulator according to a third embodiment of the present invention.

FIG. 8 is a circuit diagram illustrating a voltage regulator according to a third embodiment of the present invention. Description is made of a fold-back type overcurrent protection circuit 109c of FIG. 8. Other than the fold-back type overcurrent protection circuit 109c, this voltage regulator is similar to those of the other embodiments.

The fold-back type overcurrent protection circuit 109c of this embodiment includes amplifiers 117 and 118, a variable resistor circuit 111b, and an NMOS transistor 124, instead of the NMOS transistor 122 and the resistor 155.

The amplifier 117 has a non-inverting input terminal connected to the non-inverting input terminal of the amplifier 104, an inverting input terminal connected to a source of the NMOS transistor 124 and one terminal of the variable resistor circuit 111a, and an output terminal connected to a gate of the NMOS transistor 124. The NMOS transistor 124 has a drain connected to the drain of the sense transistor 121, an inverting input terminal of the amplifier 118, and one terminal of the variable resistor circuit 111b. The other terminal of the variable resistor circuit 111b is connected to the ground terminal 100. The amplifier 118 has a non-inverting input terminal connected to the output of the reference voltage source 107, and an output terminal connected to the gate of the PMOS transistor 123. The trimming signal generation circuit 110 has output terminals connected to the variable resistor circuits 111a and 111b.

The fold-back type overcurrent protection circuit 109c controls the limiting voltage Vfo by the resistance values of the variable resistor circuits 111a and 111b, and controls the short-circuit current Is by the resistance value of the variable resistor circuit 111b. Therefore, the limiting voltage Vfo and the short-circuit current Is can be individually controlled. Therefore, there can be obtained an effect of enabling free adjustment of the inclination of output voltage-output current characteristics of the fold-back type overcurrent protection circuit.

In this case, even when the non-inverting input terminal of the amplifier 117 is connected to the output terminal 102 or another output terminal formed in the voltage dividing circuit 106, the similar effect can be obtained.

As described above, according to the variable output voltage regulator of the present invention, through setting of a high limiting voltage Vfo when the setting value of the output voltage Vout is high, the loss can be reduced while maintaining the constant maximum current Im of the voltage regulator, even in the condition in which the loss becomes the maximum during operation of the overcurrent protection circuit.

Figure 9:
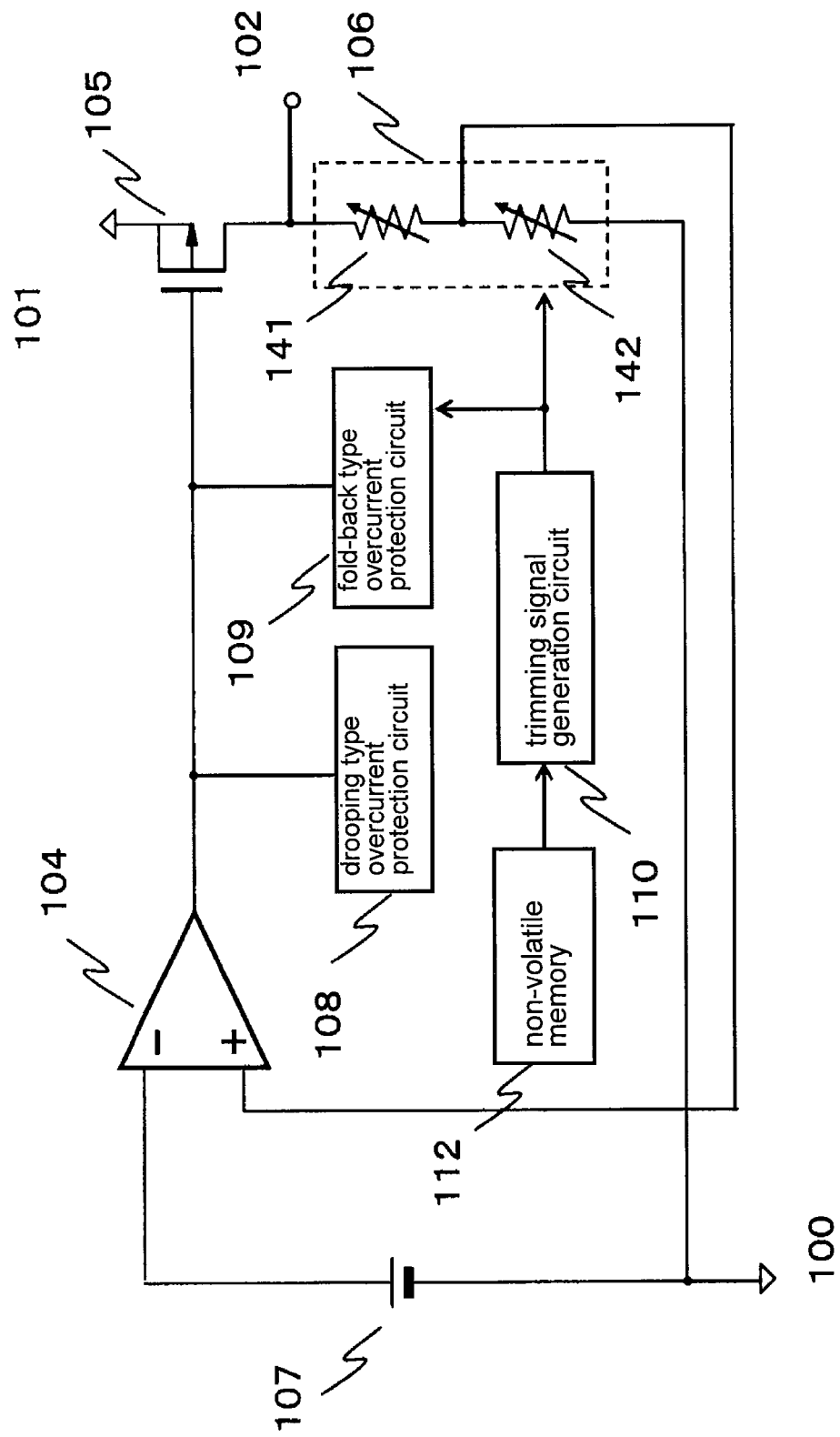
FIG. 9 is a circuit diagram illustrating another example of the variable output voltage regulator according to the embodiment mode of the present invention.
Figure 10:
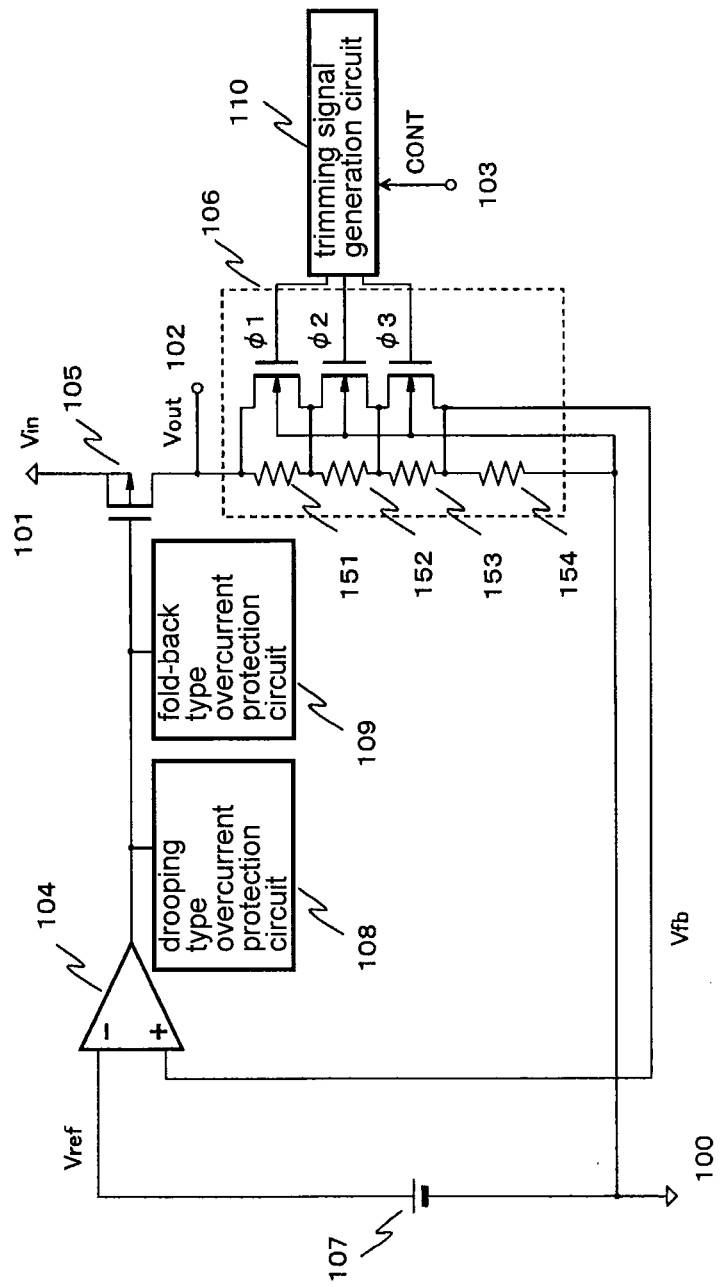
FIG. 10 is circuit diagram illustrating a conventional variable output voltage regulator.
Figure 11:
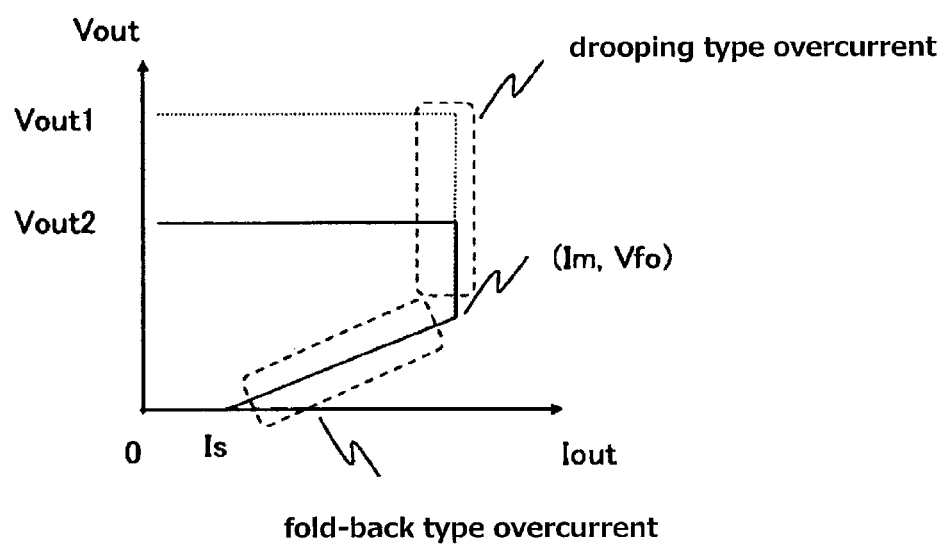
FIG. 11 is a graph showing output voltage-output current characteristics of the conventional variable output voltage regulator.

Note that, description is made above of the example in which the external control terminal 103 is connected to the input terminal of the trimming signal generation circuit 110, but as illustrated in FIG. 9, a non-volatile memory 112 may be provided.

Control information for determining the output voltage Vout, the limiting voltage Vfo of the fold-back type overcurrent protection circuit, and the short-circuit current Is is stored in advance in the non-volatile memory 112. In this manner, there can be obtained an effect that it becomes unnecessary to input the control information every time the power is activated.

What is claimed is:

1. A voltage regulator, comprising:
   an output transistor;
   a voltage dividing circuit for dividing an output voltage output from the output transistor to an output terminal, the voltage dividing circuit includes two or more switch circuits for switching in two or more resistors;
   an amplifier for comparing a divided voltage output from the voltage dividing circuit and a reference voltage so that the output voltage becomes constant;
   a drooping type overcurrent protection circuit;
   a fold-back type overcurrent protection circuit configured to lower an output current of the voltage regulator when the output voltage falls below a threshold voltage, wherein the fold-back type overcurrent protection circuit comprises:
     a sense transistor having a gate terminal connected to an output of the amplifier;
     a variable resistor circuit having one terminal connected to a drain of the sense transistor, the variable resistor circuit includes two or more switch circuits for switching in two or more resistors of the variable resistor circuit; and
     a control section for controlling a gate of the output transistor in accordance with a voltage generated in the variable resistor circuit; and
   a trimming signal generation circuit configured to selectively output a trimming signal, responsive to an input signal, to simultaneously switch in one or more of the two or more switch circuits of the voltage divider circuit and one or more of the two or more switch circuits of the variable resistor circuitry of the fold-back type over current protection circuit to simultaneously increase the output voltage and the threshold voltage of the fold-back type overcurrent protection circuit or simultaneously decrease the output voltage and the threshold voltage of the fold-back type overcurrent protection circuit.

2. A voltage regulator according to claims 1, further comprising a non-volatile storage device for storing trimming data input to the trimming signal generation circuit.

3. A voltage regulator comprising:
   an output transistor;
   a voltage dividing circuit for dividing an output voltage output from the output transistor to an output terminal, the voltage dividing circuit includes two or more switch circuits for switching in two or more resistors;
   an amplifier for comparing a divided voltage output from the voltage dividing circuit and a reference voltage so that the output voltage becomes constant;
   a drooping type overcurrent protection circuit;
   a fold-back type overcurrent protection circuit configured to lower an output current of the voltage regulator when the output voltage falls below a threshold voltage, wherein the fold-back type overcurrent protection circuit comprises:
     a sense transistor having a gate terminal connected to an output of the amplifier;
     a variable resistor circuit having one terminal connected to a drain of the sense transistor, the variable resistor circuit includes two or more switch circuits for switching in two or more resistors of the variable resistor circuit; and
     a control section for controlling a gate of the output transistor in accordance with a difference between a voltage generated in the variable resistor circuit and the divided voltage; and
   a trimming signal generation circuit, responsive to an input signal, configured to selectively output a trimming signal to simultaneously switch in one or more of the two or more switch circuits of the voltage divider circuit and one or more of the two or more switch circuits of the variable resistor circuitry of the fold-back type over current protection circuit to thereby simultaneously increase the output voltage and the threshold voltage of the fold-back type overcurrent protection circuit or simultaneously decrease the output voltage and the threshold voltage of the fold-back type overcurrent protection circuit.

4. A voltage regulator according to claim 3, wherein the fold-back type overcurrent protection circuit comprises an amplifier for detecting the difference between the voltage generated in the variable resistor circuit and the divided voltage.

5. A voltage regulator comprising:
an output transistor;
a voltage dividing circuit for dividing an output voltage output from the output transistor to an output terminal, the voltage dividing circuit includes two or more switch circuits for switching in two or more resistors;
an amplifier for comparing a divided voltage output from the voltage dividing circuit and a reference voltage so that the output voltage becomes constant;
a drooping type overcurrent protection circuit;
a fold-back type overcurrent protection circuit configured to lower an output current of the voltage regulator when the output voltage falls below a threshold voltage wherein the fold-back type overcurrent protection circuit comprises:
a sense transistor having a gate terminal connected to an output of the amplifier;
a second transistor having a drain connected to a drain of the sense transistor;
a first variable resistor circuit having one terminal connected to a source of the second transistor, the first variable resistor circuit includes two or more switch circuits for switching in two or more resistors of the first variable resistor circuit;
a first amplifier for controlling a gate of the second transistor in accordance with a difference between a voltage generated in the first variable resistor circuit and the divided voltage;
a second variable resistor circuit having one terminal connected to the drain of the sense transistor, the second variable resistor circuit includes two or more switch circuits for switching in two or more resistors of the second variable resistor circuit; and
a second amplifier for controlling a gate of the output transistor in accordance with a difference between a voltage generated in the second variable resistor circuit and the reference voltage; and
a trimming signal generation circuit, responsive to an input signal, configured to selectively output a trimming signal to simultaneously switch in one or more of the two or more switch circuits of the voltage divider circuit, and one or more of the two or more switch circuits of the first variable resistor circuit and one or more of the two or more switch circuits of the second variable resistor circuit of the fold-back type over current protection circuit to thereby simultaneously increase the output voltage and the threshold voltage of the fold-back type overcurrent protection circuit or simultaneously decrease the output voltage and the threshold voltage of the fold-back type overcurrent protection circuit.

* * * * *